(12) United States Patent
Bornert et al.

(10) Patent No.: US 8,005,649 B2
(45) Date of Patent: Aug. 23, 2011

(54) DEVICE FOR VALIDATING MEASUREMENTS OF A DYNAMIC MAGNITUDE

(75) Inventors: Pierre Bornert, Vernon (FR); Serge Le Gonidec, Vernon (FR)

(73) Assignee: SNECMA, Paris (FR)

( * ) Notice: Subject to any disclaimer, the term of this patent is extended or adjusted under 35 U.S.C. 154(b) by 101 days.

(21) Appl. No.: 12/205,077

(22) Filed: Sep. 5, 2008

(65) Prior Publication Data

US 2009/0071224 A1    Mar. 19, 2009

(30) Foreign Application Priority Data

Sep. 7, 2007    (FR) ...................................... 07 57407

(51) Int. Cl.
*H04B 15/00* (2006.01)
(52) U.S. Cl. .......... 702/189; 702/94; 702/104; 702/141; 702/150
(58) Field of Classification Search ..................... 702/93, 702/104, 141–142, 150; 701/200, 221; 324/245; 73/23.21
See application file for complete search history.

(56) References Cited

U.S. PATENT DOCUMENTS 6,997,882 B1 * 2/2006 Parker et al. .................. 600/534
7,516,038 B2 * 4/2009 Lehtonen et al. ............. 702/141
2003/0163282 A1   8/2003 Krieg et al.
2008/0168339 A1 * 7/2008 Hudson et al. ................ 714/800

FOREIGN PATENT DOCUMENTS

EP         1 053 917 A1    11/2000
WO    WO 2007/031606 A1    3/2007

OTHER PUBLICATIONS

EPO Search Report dated Jun. 12, 2008, issued in French priority application FR 07 57407.

* cited by examiner

*Primary Examiner* — Michael P Nghiem
*Assistant Examiner* — Elias Desta
(74) *Attorney, Agent, or Firm* — Weingarten, Schurgin, Gagnebin & Lebovici LLP (57) ABSTRACT

The invention relates to a device for validating measurements of a dynamic magnitude x coming from an article having main sensors placed thereon on three main axes for measuring of said dynamic magnitude x. The device includes at least two additional sensors for measuring at least two additional components of the dynamic magnitude. The additional sensors are placed on the article on at least two additional axes that are concurrent with the three main axes and that are not contained in any of the planes defined by any pair of the three main axes. The device further includes a unit for determining an estimator U representative of the dynamic magnitude from the components; and means for validating the determination of the estimator U representative of the dynamic magnitude, as well as an error detector and a localization unit for locating valid components of the dynamic magnitude.

15 Claims, 5 Drawing Sheets

DEVICE FOR VALIDATING MEASUREMENTS OF A DYNAMIC MAGNITUDE

This application claims priority to French Appln. No. 07 57407 filed Sep. 7, 2007.

FIELD OF THE INVENTION

The present invention relates to the general field of validating measurements of a dynamic magnitude and of detecting measurement failures. More particularly, the invention relates to an automatic method and device for detecting anomalies in vibration measurements, and possibly then undertaking reconfiguration in order to obtain the best possible estimate of the measured magnitude.

BACKGROUND OF THE INVENTION

Methods are known for identifying the quality of measurements of a physical magnitude (e.g. pressure, temperature, speed of rotation, movement) by making use of the principle of redundancy and making direct comparisons between measured values.

In particular, in order to validate a measurement of a dynamic magnitude (speed, movement) concerning an article, it is necessary to measure components of the magnitude by means of sensors, using for each component a main sensor and at least one other sensor that is redundant and that measures the same component. Thus, in order to measure a three-component magnitude, at least six measurement sensors are needed and that can be bulky, particularly if the space around the article is very constricted.

Another drawback results from the fact that the redundancy method cannot be envisaged for certain types of dynamic magnitude. In particular, when measuring vibration, identical redundancy is not conceivable. Furthermore, it is very difficult to compare vibratory signals that generally present frequencies that are high.

OBJECTS AND SUMMARY OF THE INVENTION

The present invention thus provides a device for validating measurements of a dynamic magnitude coming from an article having placed thereon main sensors for sensing along three concurrent main axes forming a basis $e=\{e_1 \, e_2 \ldots e_p\}$ of a physical space having $p=3$ dimensions, the sensors serving to measure components $V_j$ of said dynamic magnitude, and the device comprising:

- at least two additional sensors for measuring at least two additional components of said dynamic magnitude, said at least two additional sensors being placed on said article for sensing along at least two additional axes that are concurrent with said three main axes and that are not contained in any of the planes defined by any pair of said three main axes, said main and additional axes forming a set $a=\{a_1, a_2, \ldots, a_q\}$ of q observation axes, and said main and additional sensors forming observation sensors;
- determination means for determining an estimator representative of said dynamic magnitude from said components delivered by said observation sensors;
- validation means for validating said determination of the estimator representative of the dynamic magnitude;
- error detector means for detecting a measurement error associated with said determination of the estimator representative of the dynamic magnitude;
- localization means for locating valid components of said dynamic magnitude not giving rise to said measurement error; and
- reconstitution means for reconstituting a new estimator representative of said dynamic magnitude from said valid components delivered by said observation sensors.

Thus, the multi-axis configuration of the invention serves to validate the measurement of signals corresponding to the dynamic magnitude. This makes it possible to increase the overall reliability of the measurement and thus to improve the reliability with which the article is monitored in order to ensure that it continues operating. Furthermore, the configuration makes it possible to detect measurement anomalies or errors and to reconfigure a new estimator in the event of one or more of the observation sensors failing so as to obtain the best possible estimate of the dynamic magnitude.

The means for determining the estimator that is representative of the dynamic magnitude comprise:

- calculation means for calculating an observation matrix M that synthesizes the geometrical configuration of said observation axes, the observation matrix M of dimension p×q being defined by $M=C \cdot A$, C being the matrix of the direction cosines of the basis e, and A being the matrix component of the set a of q axes;
- calculation means for calculating an estimation matrix L from said observation matrix M satisfying $L \cdot ^T M = I_p$; and
- calculation means for calculating said estimator U representative of the dynamic magnitude as a function of said estimation matrix L of said components $V_j$ measured by said observation sensors.

This makes it possible to estimate the dynamic magnitude by using all of the observation sensors.

The validation and/or error detection means comprise:

- calculation means for calculating a parity matrix N from said observation matrix M, the parity matrix N being defined by $N \cdot ^T M = 0$; and
- calculation means for calculating a parity vector W associated with said parity matrix N and with said components of the dynamic magnitude measured by the observation sensors, serving to verify the validity of the estimator U representative of the dynamic magnitude, or to detect a measurement error associated with said determination of the estimator U, the parity vector W being defined by $W = N \cdot Z$ where Z is a matrix representation of the measurement error.

The parity vector corresponds to an image of the real error and it is thus possible to rely on the parity vector in order to obtain the greatest possible amount of information about the measurement error. This makes it possible to obtain a reliable measurement of the dynamic magnitude.

The validation means and/or the error detector means further comprise:

- calculation means for calculating a matrix of weights P from said parity matrix N and from said components of the dynamic magnitude, the matrix of weights P being equal to $N \cdot \text{diag}(V)$;
- calculation means for calculating a selection vector from said matrix of weights and from said parity vector for discriminating between relationships that are representative of consistency or inconsistency between said components of the dynamic magnitude;
- calculation means for calculating a consistency quantification matrix for quantifying the validity levels of said components of the dynamic magnitude;

calculation means for deducing a confidence vector from the consistency quantification matrix to give the confidence level of each component of the dynamic magnitude measured by each of the observation sensors; and calculation means for deducing a list of said valid components of said dynamic magnitude.

It is thus possible to quantify the validity of each measurement and to facilitate selecting valid measurements for further use.

Advantageously, the device includes initialization means for identifying the positions of said additional axes relative to the main axes with determined accuracy.

This makes it possible to begin without accurate knowledge about the positions of the additional axes. This serves to mitigate uncertainties associated with difficulties in constructing the device.

In an embodiment of the present invention, the main axes comprise a first axis, a second axis, and a third axis forming a right-handed orthogonal frame of reference, and at least one additional axis forms an angle of 45° relative to the second axis, with the directions of the first and third axes being symmetrical relative to the second axis. The device can thus be made in simple manner.

In a variant, the main axes form a right-handed orthogonal frame of reference, and at least one additional axis occupies a position that is symmetrical relative to the three main axes. Thus, the device can be made in such a manner that errors are better distributed between the measurements.

According to a feature of the invention, the main sensors correspond to accelerometers measuring axial, radial, and tangential components of the dynamic magnitude, and said additional sensors correspond to redundant accelerometers.

Advantageously, the dynamic magnitude corresponds to a vibration magnitude.

In conventional manner, it is not possible to take redundant measurements of a vibration magnitude since it is not possible to have two vibration sensors on the same axis. Thus, the present invention makes it possible to validate the measurements of signals corresponding to the vibration so as to ensure that monitoring of the article is reliable and possibly to detect measurement errors and regenerate vibration signals in the event of one or more observation sensors failing.

In an example of the present invention, said article constituting the source of the dynamic magnitude is a rotary machine.

The invention also provides a method of validating measurements of a dynamic magnitude coming from an article on which there are placed main sensors for sensing along three concurrent main axes forming a basis $e=\{e_1\ e_2 \ldots e_p\}$ of a physical space having p=3 dimensions, the main sensors serving to measure components of said dynamic magnitude, the method comprising the following steps:

measuring at least two additional components of said dynamic magnitude by means of at least two additional sensor placed on said article for sensing along at least two additional axes that are concurrent with said three main axes and that are not contained in any of the planes defined by any two of said three main axes, said main and additional axes forming a set $a=\{a_1, a_2, a_3, \ldots a_q\}$ of q observation axes, and said main and additional sensors forming observation sensors;

determining an estimator representative of said dynamic magnitude from said components delivered by said observation sensors; and validating said determination of the estimator representative of the dynamic magnitude.

The invention also provides a computer program downloadable from a communications network and/or stored on a computer-readable medium and/or executable by a microprocessor, the program including program code instructions for executing steps of the validation method when executed on a computer.

BRIEF DESCRIPTION OF THE DRAWINGS

Other features and advantages of the method and the device of the invention appear on reading the following description given by way of non-limiting indication and with reference to the accompanying drawings, in which.

DETAILED DESCRIPTION OF EMBODIMENTS

The present invention relates to an automatic method and device for detecting anomalies in measurements of a physical or dynamic magnitude coming from an article, followed by reconfiguration in order to achieve the best possible estimate of the measured magnitude.

This method is based on using redundant measurements, in a parity space, by adding at least one additional measurement of the magnitude coming from the article, along at least one additional axis.

Below, the invention is described in general terms in a space E having p dimensions. Thereafter, particular embodiments are described in a geometrical space having three dimensions. The method of the invention can be applied to any measurement of a vector magnitude, even in a vector space that is different from three-dimensional geometrical space.

Thus, a physical space E having p dimensions is determined, $E=R^p$. This physical space E is identified by a normalized basis e:

$$e=\{e_1\ e_2 \ldots e_p\} \qquad [E.1]$$

with the following matrix correspondence:

$$E=[E_1\ E_2 \ldots E_p]=I_p \qquad [E.2]$$

$E_i$ being the component of $e_i$ in the basis e and $I_p$ being the identical matrix p×p.

q measurements are available coming from a set a of q observation axes covering the space E, where q>p. Each observation axis is identified by a normalized vector $a_j$, the set a defining the system forming a set of rank p (maximum rank):

$$a=\{a_1\ a_2 \ldots a_q\} \qquad [E.3]$$

having the following matrix correspondence:

$$A=[A_1\ A_2 \ldots A_q] \qquad [E.4]$$

$A_i$ being the component of $a_i$ in the basis e

The desired physical magnitude x may be defined by a vector of the physical space E and it may be resolved into scalars along the observation axes:

$$\forall j \in 1{:}q\ Y_j = \langle a_j, x \rangle \qquad [E.5]$$

The directions of these orthogonal projections are physical (as opposed to mathematical): they are associated with the energy of the physical magnitude sensed on a particular axis.

The matrix C of the direction cosines of the basis e is defined as follows:

$$\forall i, j \in 1:p \; C_{ij} = \langle e_i, e_j \rangle \quad [E.6]$$

Relationship (E.5) then takes the following matrix form:

$$Y = {}^T A \cdot C \cdot X, \quad [E.7]$$

Y corresponds to the canonical components of the magnitude x along the observation axes a.

The observation matrix M of dimension p×q is defined by:

$$M = C \cdot A \quad [E.8]$$

in which case relationship (E.7) can also be written:

$$Y = {}^T M \cdot X \quad [E.9]$$

In practice, a vector magnitude x is measured in the form of scalars, such that the actual measurements are the magnitudes $Y_j$. The measurement $V_j$ of x along $a_j$, the magnitude $Y_j$, and the measurement error $Z_j$ are associated by the following relationship:

$$\forall j \in 1:q \; V_j = Y_j + Z_j \quad [E.10]$$

The relationship (E.10) can take the form of the following condensed matrix, referred to as the measurement relationships:

$$V = Y + Z \quad [E.11]$$

or, given (E.9):

$$V = {}^T M \cdot X + Z \quad [E.12]$$

It should be observed that the magnitudes x, Y, and Z are themselves inaccessible.

In order to estimate the physical magnitude, an estimation matrix L (of dimension p×q) is used that satisfies:

$$L \cdot {}^T M = I_p \Rightarrow L \quad [E.13]$$

A particular estimation matrix can be obtained by the least squares method:

$$L_{mc} = (M \cdot {}^T M)^{-1} \cdot M \quad [E.14]$$

It is also possible to define a linear estimator U given by:

$$U = L \cdot V \quad [E.15]$$

where U is the column relating to the basis e of a vector u of E (i.e. components of u in the basis e) that are supposed to estimate the physical magnitude x.

By multiplying (E.12) by L and injecting (E.15) therein, the following estimation relationship is obtained:

$$U - X = L \cdot Z \quad [E.16]$$

Thus, in the absence of any measurement error, the estimator coincides with the physical magnitude.

Furthermore, a parity matrix N (of dimension r×q, r being the number of the parity equation) is defined that is a non-zero matrix, by using the following relationship:

$$N \cdot {}^T A = 0 \Leftrightarrow N \cdot {}^T M = 0 \quad [E.17]$$

A particular parity matrix is a matrix in which the rows are orthonormal:

$$N_{or} \cdot {}^T N_{or} = I_r. \quad [E.18]$$

Similarly, the matrix of weights P (of dimension r×q) is defined as follows:

$$P = N \cdot diag(V). \quad [E.19]$$

which amounts to:

$$\forall k \in 1:r \; \forall j \in 1:q \; P_{kj} = N_{kj} \cdot V_j \quad [E.20]$$

where $P_{kj}$ is the weight of the $j^{th}$ measurement in the $k^{th}$ parity relationship, $N_{kj}$ is the coefficient of the $j^{th}$ measurement in the $k^{th}$ parity relationship, and $V_j$ is the measured value of x along $a_j$.

It can be convenient to introduce the rows $P_k$:

$$P = \begin{bmatrix} P_1 \\ P_2 \\ \ldots \\ P_r \end{bmatrix} \quad [E.21]$$

Thereafter, a parity vector W (formed by canonical components) can be defined as follows:

$$W = N \cdot V. \quad [E.22]$$

It can also be deduced from P:

$$\forall k \in 1:r \quad W_k = \sum_{j=1:q} P_{kj} = \text{sum}(P_k) \quad [E.23]$$

By multiplying (3·12) by N and injecting (E.17) therein, the following "parity" relationship is obtained:

$$W = N \cdot Z \quad [E.24]$$

The parity vector, which is accessible (relationship (E.22)) becomes zero at the same time as the measurement errors. Thus, coherence between redundant measurements enables measurement error to be evaluated.

Comparing $W_k$ with $P_k$ makes it possible to determine which relationships are meaningful, representing measurements that are consistent or that are inconsistent, and use is made of this feature.

Thus, a selection vector S is defined that specifies these meaningful relationships:

$$\forall k \in 1:r \quad [E.25]$$

$$S_k = \begin{cases} 1 & \text{if the } k^{th} \text{ parity relationship represents consistent measurements} \\ 0 & \text{if the } k^{th} \text{ parity relationship is not meaningful (no decision)} \\ -1 & \text{if the } k^{th} \text{ parity relationship represents inconsistent measurements} \end{cases}$$

By way of example, $S_k$ may be defined as follows:

$$\frac{|W_k|}{\|P_k\|_1} > s_1 \Rightarrow S_k = 1 \text{ with for example} \quad [E.26]$$

$$\|P_k\|_1 = \max_{j=1:q}(|P_{kj}|)$$

$$S_k = \frac{|W_k|}{\|P_k\|_0} < s_0 \Rightarrow S_k = 1 \text{ with for example}$$

$$\|P_k\|_0 = \min_{j=1:q}(|P_{kj}|)$$

$$\text{else } S_k = 0$$

After selecting the pertinent parity relationships, comparing $W_k$ with $P_k$ makes it possible to make use of them.

The quantification matrix Q (of dimension r×q) is then defined that quantifies the validity levels of the measurements:

$$\forall k \in 1:r \; \forall j \in 1:q \qquad \text{[E. 27]}$$

$$Q_{kj} = \begin{cases} > 0 \text{ represents the consistency level of the } j^{th} \text{ measurement in the } k^{th} \text{ parity relationship} \\ 0 \Leftarrow S_k = 0 \\ < 0 \text{ represent the inconsistency level of the } j^{th} \text{ measurement in the } k^{th} \text{ parity relationship} \end{cases}$$

For example, $\forall k \in 1:r \; \forall j \in 1:q$:

$$\begin{cases} S_k = 0 \Rightarrow \forall j \in 1:q \; Q_{kj} = 0 \\ S_k = 1 \Rightarrow \forall j \in 1:q \; Q_{kj} = \frac{|P_{kj}|}{|W_k|} \text{ (distributing as a function of weight)} \\ S_k = -1 \Rightarrow \forall j \in 1:q \; Q_{kj} = -\frac{|W_k|}{\|P_k\|} \\ \text{(sharing an error of unknown origin)} \end{cases} \qquad \text{[E. 28]}$$

$Q_{kj}$ being the level of consistency (or of inconsistency) of the $j^{th}$ measurement in the $k^{th}$ parity relationship.

After quantifying the validity levels by measurement and by parity relationship, the idea is to perform one synthesis per measurement, using logic that depends on criticality.

Thus, a confidence vector R is defined giving the confidence level per measurement, as it results from the matrix Q $$\forall j \in 1:q$$

$$R_j = \begin{cases} > 0 \text{ is the confidence level reached by the } jth \text{ measurement} \\ 0 \text{ means no decision concerning the } jth \text{ measurement} \\ < 0 \text{ is the anomaly level reached by the } jth \text{ measurement} \end{cases}$$

where $R_j$ is the confidence (or anomaly) level reached by the $j^{th}$ measurement.

For example, for a systematic strategy, which requires careful prior quantification:

$$\forall j \in 1:q \qquad \text{[E. 30]}$$

$$R_j = \sum_{k=1:r} Q_{kj}$$

For a prudent strategy (highly critical anomaly):

$$\forall j \in 1:q \qquad \text{[E. 31]}$$

$$R_j = \min_{k=1:r}(Q_{kj})$$

Finally, for an optimistic strategy (anomaly of low criticality):

$$\forall j \in 1:q \qquad \text{[E. 32]}$$

$$R_j = \max_{k=1:r}(Q_{kj})$$

It is then possible to deduce the list of valid measurements by means of their indices:

$$J = \{j \in 1:q \; V_j \text{ valid}\} \qquad \text{[E.33]}$$

This list can be established merely by thresholding on R:

$$J = \{j \in 1:q \; R_j > r\} \qquad \text{[E.34]}$$

In a variant, by setting a priori a number of measurements that are to be conserved, it is possible systematically to select the s best measurements ($p \leq s \leq q$), or more if there are dead heats:

$$J = \{j_1, \ldots, j_s \in 1:q \; \forall j \in (1:q) \notin J \; R_{j_i} \geq R_j\} \qquad \text{[E.35]}$$

[E. 29]

It is also possible to combine both approaches, by setting a threshold r and some minimum number s of measurements to be conserved. Thus, if r leads to a number of measurements that is less than s, then r is forgotten and the s best measurements are concerned, or more if there are any dead heats.

Furthermore, in order to reconstitute the system, it is possible to reject bad measurements and take into consideration only the reduced system comprising the remaining measurements. This produces a new parity system that can be handled using the same tools as described above. The resulting reduced systems are referred to as "mutilated systems".

Assume that amongst the initial q measurements, only $q_j$ measurements are valid (the others being faulty). It is then possible to define the characteristics of the new system as obtained in this way, referred to as a "mutilated" system, as follows:

The indices of the remaining valid measurements are grouped together in the vector J:

$$J = \lfloor j_1 j_2 \ldots j_{q_J} \rfloor \qquad [E.36]$$

The p×p matrix of the direction cosines of the basis e remains unchanged:

$$_JC = C \qquad [E.37]$$

The remaining observation axes are:

$$_Ja = a_J \qquad [E.38]$$

The matrix of the observation axes in the basis e is therefore:

$$_JA = A_J \qquad [E.39]$$

From relationship (E.8) it can be deduced that the observation matrix M is:

$$_JM = M_J \qquad [E.40]$$

The measurement matrix to be taken into consideration is naturally:

$$_JV = V_J \qquad [E.41]$$

Thereafter, the various equations described above (estimation matrix, etc.) are applied while ensuring that the condition $q_j \geq p$ is satisfied.

In particular, and in order to guarantee operation without exception, it is appropriate to define a specific strategy when the number of measurements retained as valid is not sufficient. Mathematically, this can be written as $0 \leq q_j < p$ ($q_j=0$ corresponds to an empty vector J).

It should be observed that such circumstances can arise only when J is constructed merely by thresholding (see relationship (E.34)).

In order to avoid blocking progress of the calculation because of this exception, it suffices to define the magnitudes of the mutilated system corresponding to such a J, which is written $J_0$.

Under such circumstances, it is advantageous to decide to return to the set of initial measurements which amounts to handling the problem as though $J_0 = 1:q$, i.e.

$$_{J_0}C = C \qquad [E.42]$$

$$_{J_0}a = a \qquad [E.43]$$

$$_{J_0}A = A \qquad [E.44]$$

$$_{J_0}M = M \qquad [E.45]$$

$$_{J_0}V = V \qquad [E.46]$$

Advantageously, the estimate from a mutilated system is associated with a confidence level (this is particularly advantageous in the so-called $J_0$ degraded configuration where the strategy consists in performing the same calculation only if all of the measurements are valid.

This confidence level written $_JT$ stems naturally from the individual confidence levels $R_j$ of the measurements actually retained for the calculation (R in full for $J_0$).

For example, for a systematic strategy (requiring careful quantification:

$$_JT = \sum_{j=J} R_j \qquad [E.47]$$

$$_{J_0}T = \sum_{j=1:q} R_j = \text{sum}(R) \qquad [E.48]$$

For a prudent strategy (a high level of criticality):

$$_JT = \min_{j=J}(R_j) \qquad [E.49]$$

$$_{J_0}T = \min_{j=1:q}(R_j) = \min(R) \qquad [E.50]$$

In practice, the observation axes a are known, at least to within a certain accuracy (which represents the differences between the measurement device as defined and as made).

It is also possible to construct a basis e from p non-associated observation axes, preferably using those for which knowledge is the most reliable and accurate (these axes are referred to as the principal axes).

Apart from renumbering, generality remains undiminished if it is assumed that these axes are given the lowest numbers (1 to p):

$$\forall i \in 1:p \ e_i = a_i \qquad [E.51]$$

In order to distinguish these main axes better from the others, referred to as additional or redundant axes, the following vectors $b_k$ are introduced:

$$\forall k \in 1:q-p \ b_k = a_{p+k} \qquad [E.52]$$

the set defining the following systems:

$$b = \{b_1 b_2 \ldots b_{q-p}\} \qquad [E.53]$$

for which the matrix correspondence is:

$$B = \lfloor B_1 B_2 \ldots B_{q-p} \rfloor \qquad [E.54]$$

In which case A has the form:

$$A = \lfloor I_p B \rfloor \qquad [E.55]$$

A parity matrix N can be immediately deduced from relationship (E.55), i.e. a matrix satisfying relationship (E.17):

$$N = \lfloor {}^TB - I_{q-p} \rfloor \qquad [E.56]$$

Furthermore, it is possible to accept a degree of latitude in how the observation axes are predetermined.

It is possible to ignore the additional (redundant) axes, which can be very practical, particularly when it is difficult to set up the instrument. In the limit, it suffices to be aware of the existence of redundant axes and of their number, without knowing the relationships that associate them with the main axes.

The relationships between the main and the additional axes can be determined automatically.

With the selected identification, the problem amounts to estimating the matrix B. Thus, starting from the parity relationship $N \cdot V = N \cdot Z$, and using the previously selected particular parity matrix N, the following is obtained:

$$^TB \cdot V_{1:p} = V_{p+1:q} + N \cdot Z \qquad [E.57]$$

This relationship is valid at all times, and by applying it at distinct instants $t_1, t_2, \ldots, t_p$, the following matrix equation is obtained:

$$^TB \cdot [V_{1:p}(t_1) V_{1:p}(t_2) \ldots V_{1:p}(t_p)] = [V_{p+1:q}(t_1) V_{p+1:q}(t_2) \ldots V_{p+1:q}(t_p)] + N \cdot [Z(t_1) Z(t_2) \ldots Z(t_p)]$$

Providing the fluctuations of the measurements are "natural", the p×p matrix obtained from the vectors $V_{1:p}(t_i)$ is invertible, whence:

$$B = \begin{bmatrix} ^TV_{1:p}(t_1) \\ ^TV_{1:p}(t_2) \\ \ldots \\ ^TV_{1:p}(t_p) \end{bmatrix}^{-1} \cdot \left( \begin{bmatrix} ^TV_{p+1:q}(t_1) \\ ^TV_{p+1:q}(t_2) \\ \ldots \\ ^TV_{p+1:q}(t_p) \end{bmatrix} + \begin{bmatrix} ^TZ(t_1) \\ ^TZ(t_2) \\ \ldots \\ ^TZ(t_p) \end{bmatrix} \cdot {}^TN \right) \quad \text{[E. 58]}$$

From this equation, it is possible to devise several practical methods of estimation.

Under ideal circumstances, it is possible to define a precise calibration zone, i.e. instants during which the measurement error Z is negligible, in which case relationship (E.55) gives the following:

$$B \approx \begin{bmatrix} ^TV_{1:p}(t_1) \\ ^TV_{1:p}(t_2) \\ \ldots \\ ^TV_{1:p}(t_p) \end{bmatrix}^{-1} \cdot \begin{bmatrix} ^TV_{p+1:q}(t_1) \\ ^TV_{p+1:q}(t_2) \\ \ldots \\ ^TV_{p+1:q}(t_p) \end{bmatrix} \quad \text{[E. 59]}$$

Otherwise, it is possible to define a calibration zone that is subjected to noise at a low level, i.e. instants during which the measurement error Z remains low and behaves like a centered distribution, in which case the relationship (E.59) can be used on n systems of the type $t_1, t_2, \ldots, t_p$:

$$B \approx \text{mean} \left( \begin{bmatrix} ^TV_{1:p}(t_1) \\ ^TV_{1:p}(t_2) \\ \ldots \\ ^TV_{1:p}(t_p) \end{bmatrix}^{-1} \cdot \begin{bmatrix} ^TV_{p+1:q}(t_1) \\ ^TV_{p+1:q}(t_2) \\ \ldots \\ ^TV_{p+1:q}(t_p) \end{bmatrix} \right)_{j=1:n} \quad \text{[E. 60]}$$

Finally, in the most unfavorable circumstances, the measurement error Z behaves in totally unpredictable manner (non-centered noise, random peaks, . . . ). It is then possible to perform statistical analysis, e.g. by applying relationship (E.59) to n systems of the type $t_1, t_2, \ldots, t_p$, and then in establishing a histogram for each scalar $B_{ij}$, from which it is verified whether a value can be extracted which is then retained as an estimator (the most probable value):

$$B \approx \max \text{hist} \left( \begin{bmatrix} ^TV_{1:p}(t_1) \\ ^TV_{1:p}(t_2) \\ \ldots \\ ^TV_{1:p}(t_p) \end{bmatrix}^{-1} \cdot \begin{bmatrix} ^TV_{p+1:q}(t_1) \\ ^TV_{p+1:q}(t_2) \\ \ldots \\ ^TV_{p+1:q}(t_p) \end{bmatrix} \right)_{j=1:n} \quad \text{[E. 61]}$$

These estimators are then easy to implement since they depend only on the measurements.

Under all circumstances, a distinction needs to be drawn between the initialization stage used for estimating B, during which no attempt it made to analyze the physical magnitudes, and the measurement stage in which B as determined in this way is used for the purpose of estimating the measurements. It is even possible to handle systems that vary slowly (relative to calculation step time) by alternating initialization stages and measurement stages, or more precisely by carrying them out in parallel, with each initialization stage being used for the following measurement stage.

In order to deduce automatically the directions of the additional (redundant) observation axes, it is assumed that the directions of the main axes are known, i.e. in the selected frame of reference $e = \{a_1 \, a_2 \ldots a_p\}$, for which the matrix C is assumed to be known.

From relationships (E.8) and (E.55) the following can be found immediately:

$$M = [C \; C \cdot B]$$

A matrix D can be written as follows:

$$D + C \cdot B \quad \text{[E.62]}$$

This gives:

$$M = [C \; D] \quad \text{[E.63]}$$

The direction cosines correspond exactly to the matrix D since:

$$\forall k \in 1:q-p \; \forall i \in 1:p \; D_{ik} = \langle e_i, b_k z, \mathbf{41} \rangle \quad \text{[E.64]}$$

Thus, knowing C, and once B has been estimated, relationship (E.62) provides the estimator for D.

The angles between the redundant axes and the main (or basis) axes correspond to the following matrix:

$$\alpha = \text{acos}(D) \quad \text{[E.65]}$$

each element being:

$$\forall k \in 1:q-p \; \forall i \in 1:p \; \Delta_{ik} = acos(D_{ik}) \quad \text{[E.66]}$$

In a geometrical physical space (p≧3), these angles specify very concretely the disposition of the observation axes.

The problem involved can be summarized as follows:
it is assumed that the main axes are known by means of the matrix C; and
the redundant axes are determined automatically relative to the main axes, by means of the matrix B.

However, B was estimated solely on the basis of measurements V, and thus at no time is any use made of normalizing the unit vectors of the axes.

For the main axes, this is satisfied by the relationship (E.6):

$$\text{diag}(C) = 1_{p,1}$$

For the redundant axes, this is given by $$\text{diag}(^TB \cdot C \cdot B) = 1_{q-p,1} \quad \text{[E.67]}$$

which can also be written, taking the columns of B into consideration, as follows:

$$\forall k \in 1:q-p \; ^TB_k \cdot C \cdot B_k = 1 \quad \text{[E.68]}$$

Figure 1A:
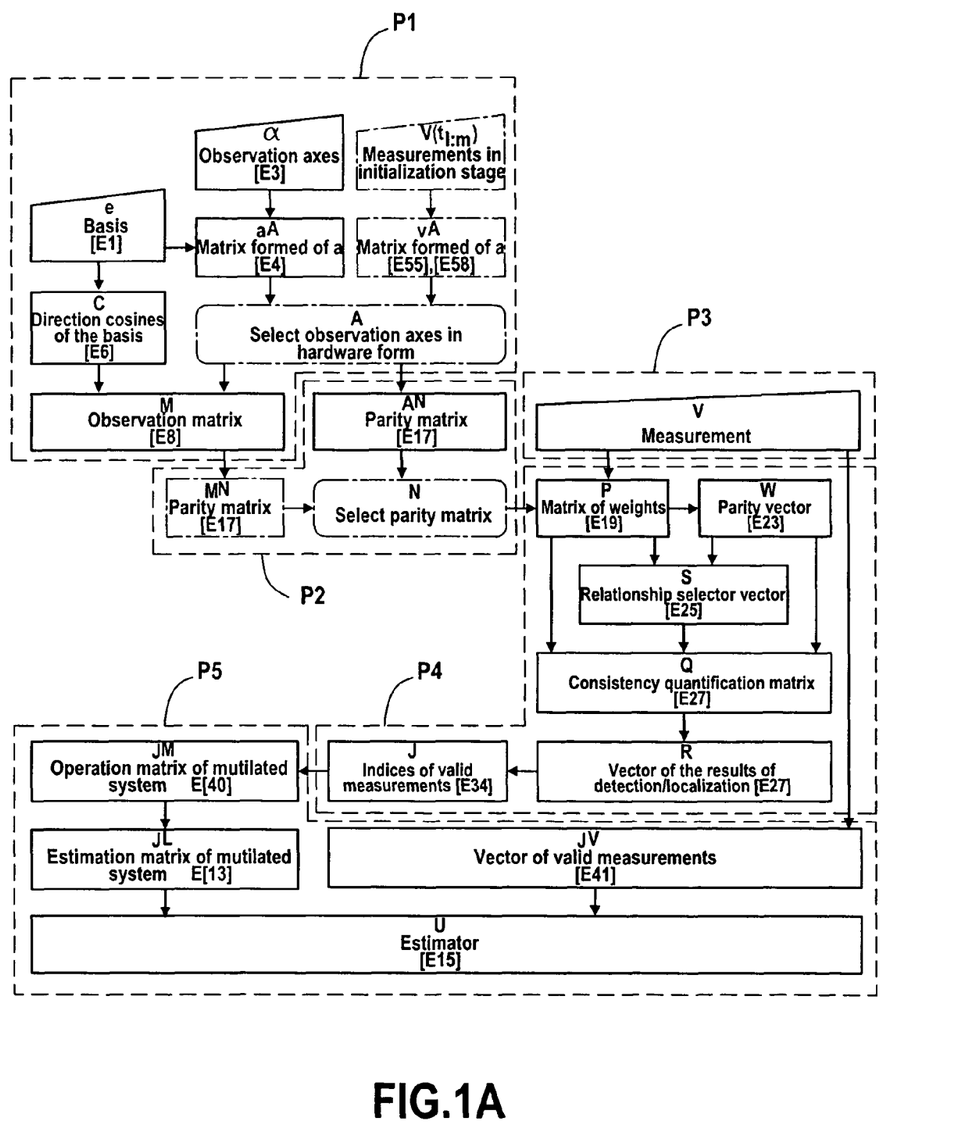
FIGS. 1A to 1C illustrate algorithms describing the validation method of the invention.
Figure 1B:
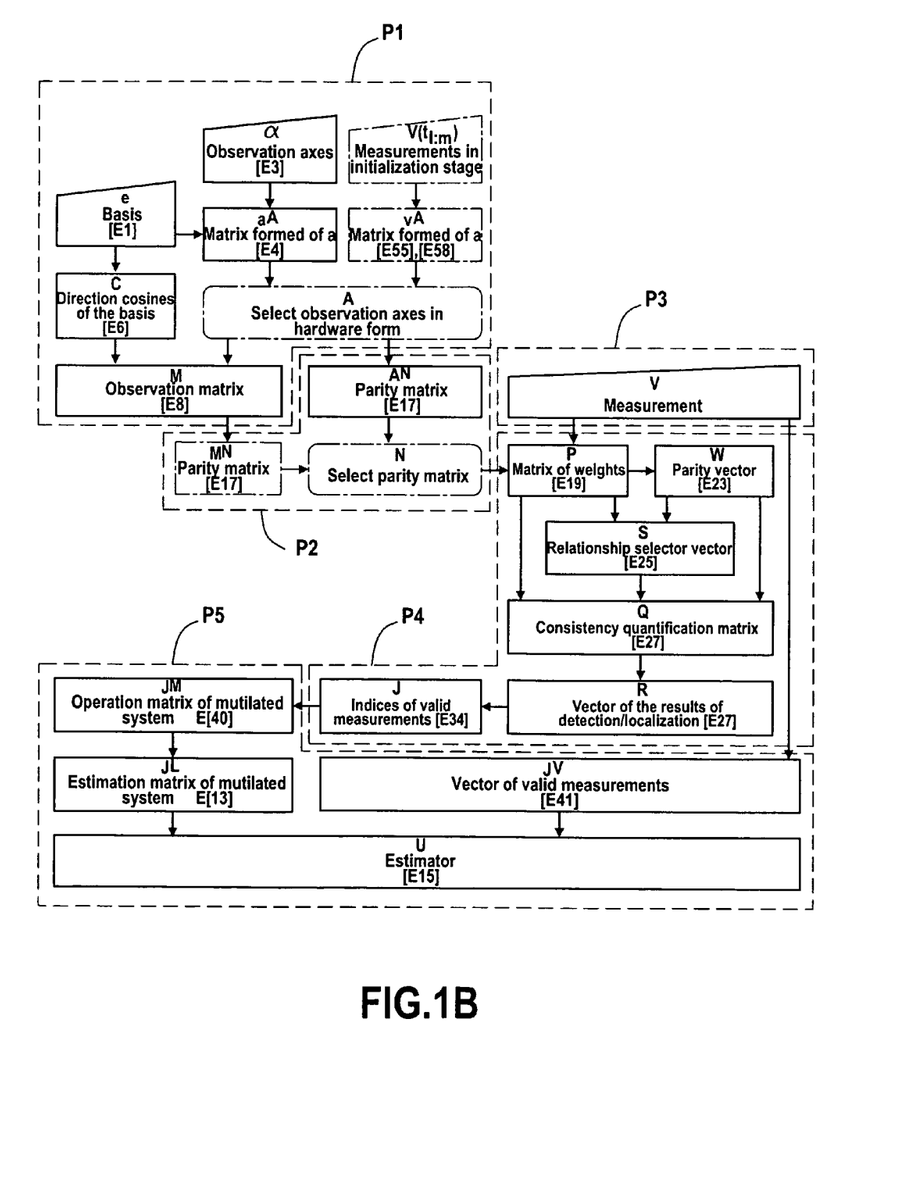
Figure 1C:
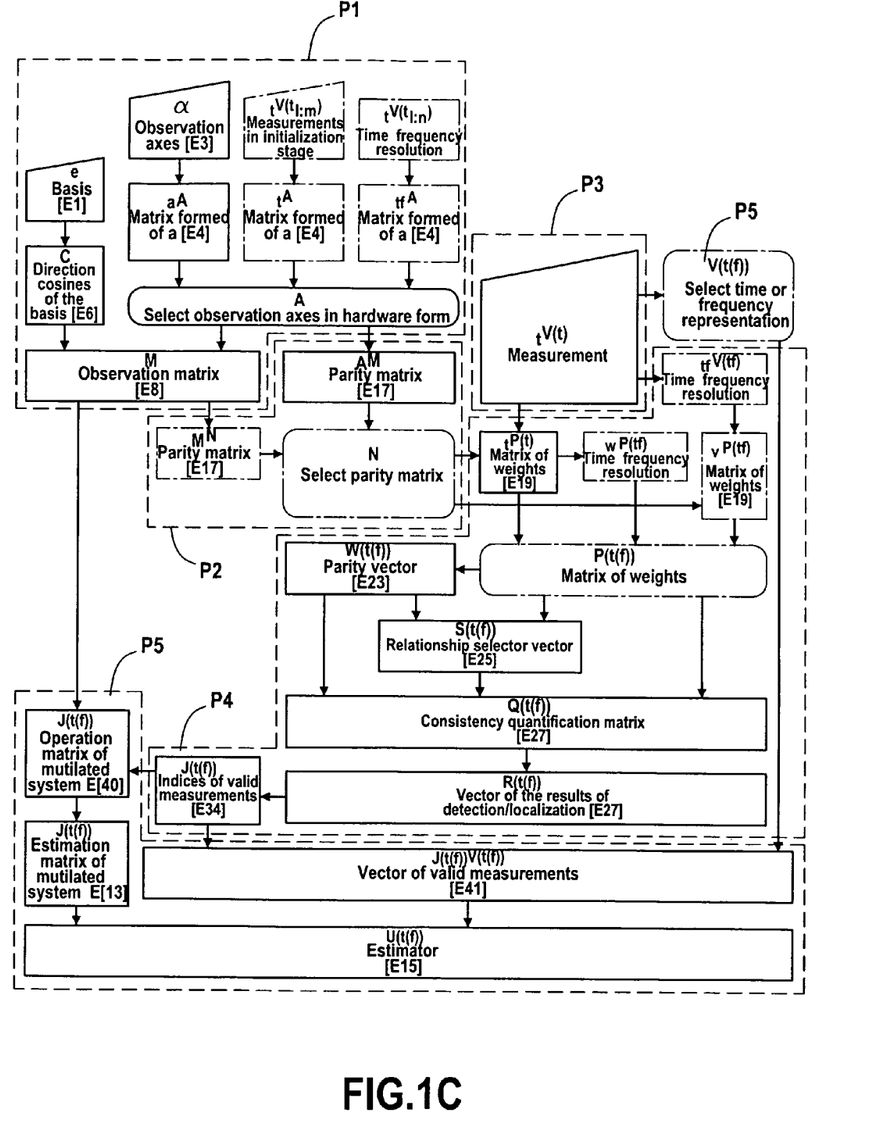

FIGS. 1A to 1C shown various algorithms summarizing the method explained above.

Each block represents a function that may have a plurality of inputs, but only one output, and that is the variable having the same name as the block.

Thus, each arrow entering a block corresponds to an input and a plurality of arrows leaving a given block correspond to the same output.

Each block is constituted by two or three items of information comprising the name of the calculated variable (output);

a brief description of the operation; and optionally the method in the form of references to the equations involved.

Furthermore, the shapes of the blocks serve to distinguish more easily inputs (blocks of trapezoidal shape), processing (blocks of rectangular shape), and selecting (blocks in the form of rectangles with rounded corners).

Dashed lines represent optional paths that are alternatives to some other paths, with selection then being represented by a selector type block.

Furthermore, the blocks are grouped together depending on the different stages of the algorithm. Thus, the geometrical configuration stage is referenced P1, the stage of formalizing redundancy is referenced P2, the stage of performing the measurement is referenced P3, the detection-localization stage is referenced P4, and the reconstitution stage is referenced P5.

More particularly, FIG. 1A is a basic flow chart or logic diagram. FIG. 1B is a time flow chart applying the basis flow chart at all times. Finally, FIG. 1C is a generalized time-frequency flow chart.

FIGS. 2 to 5 show particular embodiments of a device of the invention for validating measurements of a physical magnitude.

Figure 2:
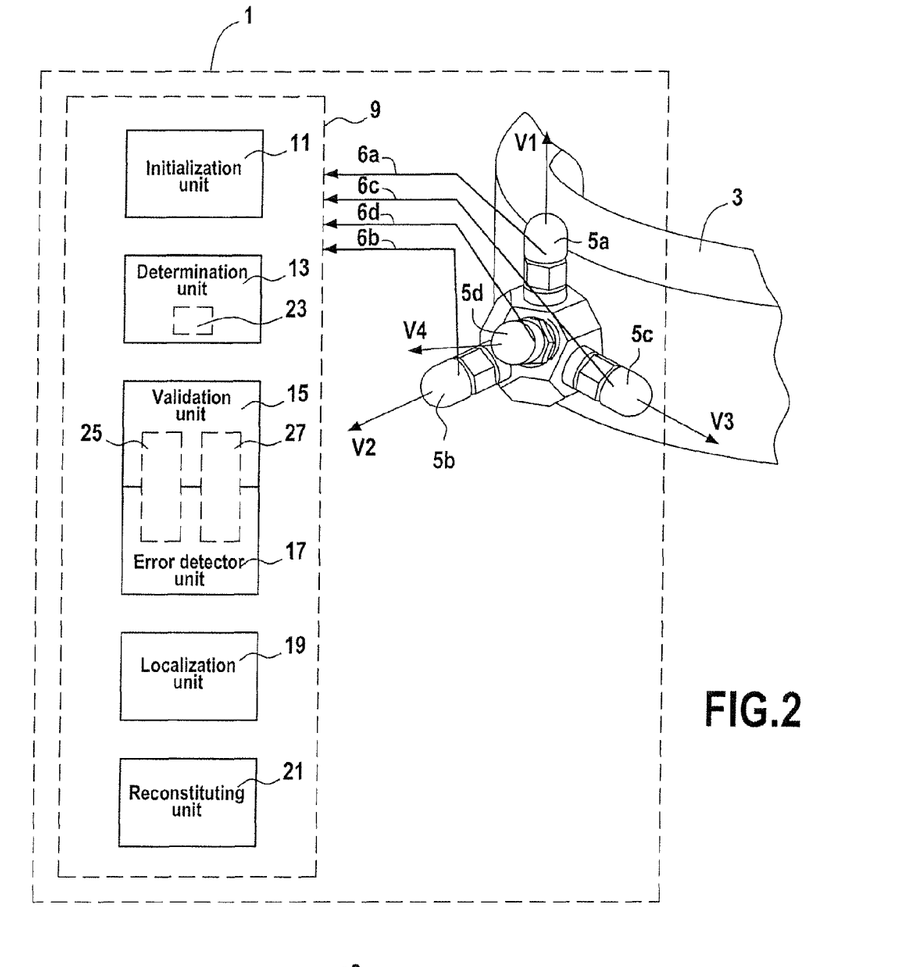
FIG. 2 is a highly diagrammatic view of a validation device of the invention.

More particularly, FIG. 2 is a diagram of a device 1 for validating measurements of a dynamic magnitude x coming from an article 3. FIG. 2 is also an illustration of the main steps in the method of the invention for validating the measurements.

By way of example, the measured dynamic magnitude x may correspond to a vibration magnitude. Furthermore, the article 3 that is the source of the dynamic magnitude may be a rotary machine, e.g. a turbine, a piston engine, or any other type of machine.

Three main sensors 5a, 5b, and 5c are placed on the article 3 (e.g. on the casing of a turbine) in order to measure components $V_j$ of the dynamic magnitude x along three main axes that intersect at a point forming a basis $\{a_1\ a_2\ a_3\}$.

Figure 4:
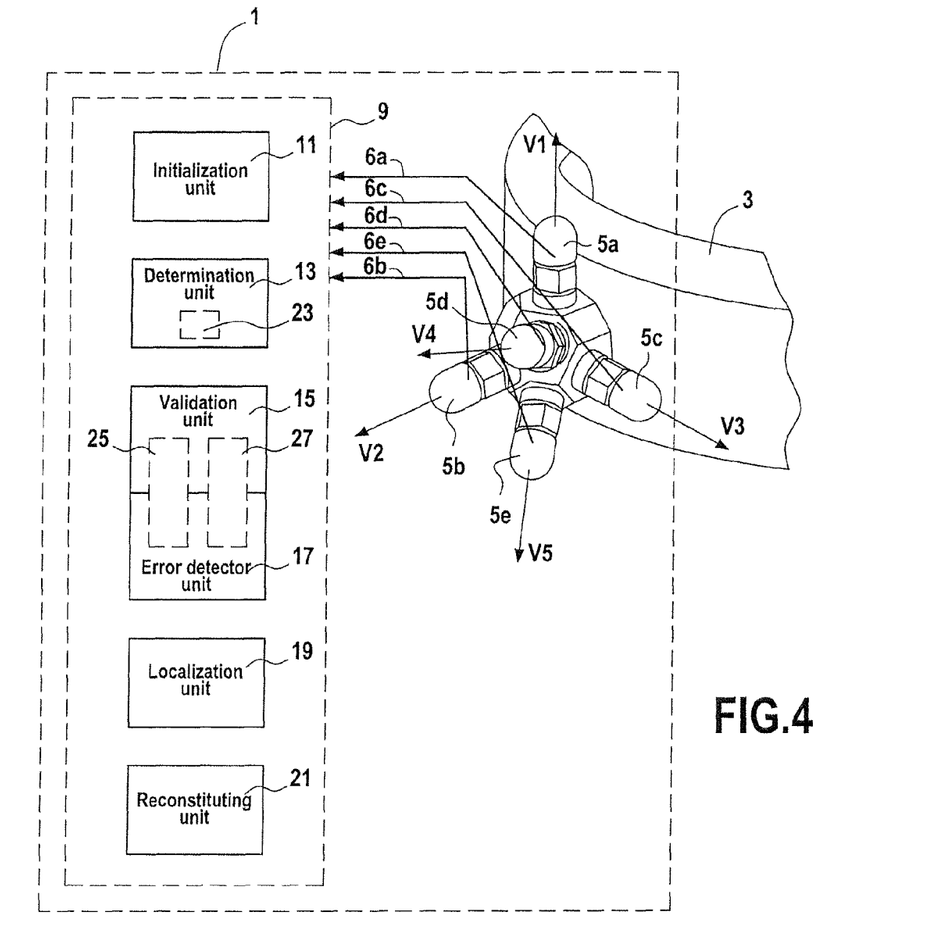
FIG. 4 is a highly diagrammatic view showing another example of a validation device of the invention.

In addition, the device includes an additional sensor 5d for measuring an additional component $V_4$ of the dynamic magnitude. This additional sensor 5d is placed on the article on an additional axis $a_4$ that intersects the three main axes and that is not contained in any of the planes defined by any pair of the three main axes. Naturally, the validation device 1 could have a plurality of additional sensors placed on a plurality of additional axes (for example FIG. 4 shows a device having two additional sensors 5d and 5e placed on the article on two additional axes). The main and additional axes form observation axes and the main and additional sensors form observation sensors.

Figure 3:
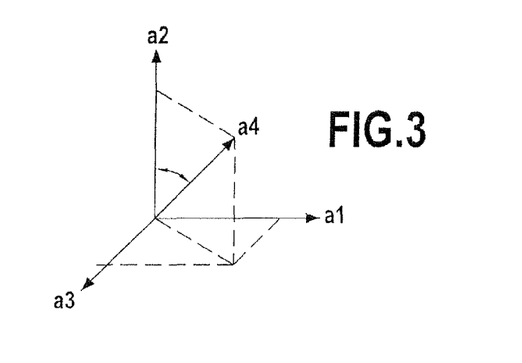
FIG. 3 shows a configuration of observation axes of the invention.

FIG. 3 shows an example of the geometrical configuration of the observation sensors. This configuration has a first axis $a_1$, a second axis $a_2$, and a third axis $a_3$ that intersect at a point and that form a right-handed orthogonal frame of reference. The additional axis $a_4$ is at an angle of 45° relative to the second axis $a_2$ and the directions of the first and third axes $a_1$ and $a_3$ are symmetrical about the second axis $a_2$.

From this it can be deduced that the angles between $V_1$ and $V_4$ and between $V_3$ and $V_4$ are identical and equal to 60°. This can be established by taking into consideration the unit vectors $a_i$ and the orthogonal projections of the additional axis $a_4$ onto the other three axes.

The coordinates of the additional axis $a_4$ in the orthonormal basis $\{a_1\ a_2\ a_3\}$ are thus:

$$A_4 = \begin{bmatrix} 1/2 \\ 1/\sqrt{2} \\ 1/2 \end{bmatrix}$$

from which the angle $$acos(\langle a_1, a_4 \rangle) = acos(\langle a_2, a_4 \rangle) = acos(1/2) = 60°$$

It should be observed that it is quite simple from a mechanical point of view to establish remarkable angles (e.g. 90°, 60°, or 45°) between the axes.

In a variant, and still using a right-handed orthogonal frame of reference, the additional axis $a_4$ could occupy a position that is symmetrical relative to all three main axes:

$$A_4 = \begin{bmatrix} 1/\sqrt{3} \\ 1/\sqrt{3} \\ 1/\sqrt{3} \end{bmatrix}$$

Under such circumstances, the angles between the axes are then:

$$acos(\langle a_1, a_4 \rangle) = acos(\langle a_2, a_4 \rangle) = acos(\langle a_3, a_4 \rangle) = acos(1/\sqrt{3}) \approx 54.7°$$

This configuration is better optimized than the preceding configuration, but it can be more difficult to make.

Another variant can relate to a configuration of four axes with complete isometry between the axes, leading to axes that are positioned at 120° relative to one another.

In addition, the validation device 1 may have initialization means 11 for identifying with determined accuracy the position of the additional axis $a_4$ (or additional axes) relative to the main axes $\{a_1\ a_2\ a_3\}$.

The above-described method can be applied to the special case in which the physical space E is no more than the three-dimensional geometrical space $\{a_1\ a_2\ a_3\}$; where the space E is covered by three measurements (main components) $V_1, V_2, V_3$ (p=3); and where there exists at least one redundant measurement (additional component) $V_4$ (q≧4).

Thus, the initialization means 11 use the method described above for identifying positions in the space. Use is made initially of the geometrical configuration, and it is then assumed that the redundant axis (defined by $a_4$) is not known, and the stage of formalizing the redundancy is applied.

Furthermore, it should be observed that the main sensors 5a to 5c correspond to accelerometers that measure the axial, radial, and tangential components of the dynamic magnitude. The additional sensor 5d thus corresponds to a redundant accelerometer. The four sensors 5a to 5d thus form four channels 6a to 6d (or four measurement systems) that are connected to data processor means 9.

The four sensors 5a to 5d and the measurement system may be identical. By way of example, the sensors 5a to 5d are accelerometers each having a passband of 30 kilohertz (kHz) and a measurement range of ±1500 g (where g is the acceleration due to gravity), each channel being acquired at a rate of 10,240 points per second.

In addition, the validation device 1 has determination means 13 and validation means 15.

The determination means 13 are for determining an estimator U representative of the dynamic magnitude from the components delivered by the observation sensors 5a to 5d.

Finally, the validation means 15 are for validating the determination of the estimator U that is representative of the dynamic magnitude.

Furthermore, the validation device 1 has error detector means 17, localization means 19, and reconstituting means 21.

The error detector means 17 are adapted to detect a measurement error associated with determining the estimator U representative of the dynamic magnitude.

The localization means 19 are adapted to locate valid components of the dynamic magnitude that do not generate measurement errors.

The reconstituting means 21 are adapted to reconstitute a new estimator U representative of the dynamic magnitude from the valid components delivered by the observation sensors 5a to 5d.

It should be observed that the number of detectable failures is equal to q−p and that the number of locatable failures is equal to q−p−1. If only one additional axis $a_4$ is defined, then it is possible to detect a failure but it cannot be located. Thus, in order to be able to locate a failure, it is necessary to use at least two additional axes.

More particularly, the determination means 13 for determining that the estimator U representative of the dynamic magnitude comprise first calculation means 23.

These first calculation means 23 are adapted to calculate an observation matrix M (see relationships (E.8); (E.38)) that synthesizes the geometrical configuration of the observation axes.

The first calculation means 23 are also adapted to calculate an estimation matrix L (see equation (E.13)) from the observation matrix M.

In addition, the first calculation means 23 are adapted to calculate the estimator U (see relationship (E.15)) that is representative of the dynamic magnitude as a function of the estimation matrix L and of the components V measured by the observation sensors 5a to 5d.

Furthermore, the validation means 15 or the error detector means 17 include second calculation means 25.

These second calculation means 25 are adapted to calculate a parity matrix N from the observation matrix M (see relationship (E.17)).

The second calculation means 25 are also adapted to calculate a parity vector W (E.22) associated with the parity matrix N and with the components $V_j$ of the dynamic magnitude as measured by the observation sensors 5a to 5d and serving to verify that the estimator U representative of the dynamic magnitude is valid or to detect a measurement error associated with said determination of the estimator U.

Furthermore, the validation means 15 and/or the error detector means 17 also include third calculation means 27.

These third calculation means 27 are adapted to calculate a matrix of weights P (see relationship (E.19)) from the parity matrix N and from the components $V_j$ of the dynamic magnitude.

The third calculation means 27 are also adapted to calculate a selection matrix S (see relationship (E.25)) from the matrix of weights P and from the parity vector W serving to discriminate between relationships that are representative of consistency or inconsistency between the components $V_j$ of the dynamic magnitude.

The third calculation means 27 are also adapted to calculate a consistency quantification matrix Q (see relationships (E.27)) serving to quantify the validity levels of the components $V_j$ of the dynamic magnitude.

The third calculation means 27 are also adapted to deduce a confidence vector R from the consistency quantification matrix Q serving to give the confidence level of each component $V_j$ of the dynamic magnitude measured by each of the observation sensors 5a to 5d (see relationship (E.29)).

Finally, the third calculation means 27 are adapted to deduce a list of valid components $V_j$ of the dynamic magnitude (see relationship (E.33)).

It should be observed that the first, second, and third calculation means 23, 25, and 27 could be constituted by the same calculation means. More generally, all of the: initialization means 11; determination means 13; validation means 15; error detector means 17; localization means 19; and reconstituting means 21; could be incorporated in the data processor means 9 implemented by a computer or a microprocessor.

FIG. 4 shows a device that differs from that of FIG. 2 solely by the fact that it has two additional sensors 5d and 5e that are for measuring two additional components $V_4$ and $V_5$ of the dynamic magnitude. Under such circumstances, the five sensors 5a to 5e form five channels 6a to 6e that are connected to the data processor means 9.

Figure 5:
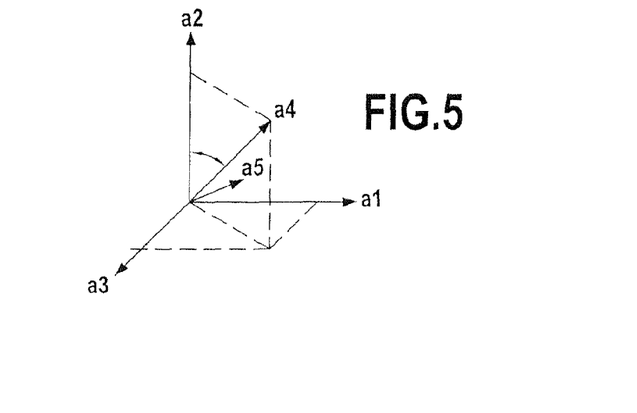
FIG. 5 shows a configuration of five observation axes of the invention.

In addition, FIG. 5 shows that the additional sensors 5d to 5e are placed on the article on two additional axes $a_4$, $a_5$ (naturally, these axes intersect the three main axes at the point where they are themselves concurrent, and they are not contained in any of the planes defined by any pair of axes selected from the three main axes).

The invention also provides a computer program downloadable from a communications network (or stored on a computer-readable medium) and including program code instructions for executing the steps of the validation method of the invention when executed on a computer.

The computer program serves to cover the various stages of calculating magnitudes that are characteristic of a parity system, and of making use thereof for the purposes of detecting, locating, and reconstructing faulty measurements.

No assumption is made about the redundant measurement system. The computer program processes any p-dimensional space covered by q measurements.

Furthermore, the program may be in the form of generic functions, in which the input and output arguments are clearly identified, enabling modular operation, thus making it flexible to use, and therefore applicable to any type of measurement validation device.

The program can make use of any programming language, and it may be in the form of source code, object code, or code that is intermediate between source code and object code, such as in a partially compiled form, or in any other desirable form.

The invention also provides a computer readable data medium including computer program instructions as mentioned above.

Thus, the present invention makes it possible automatically to find the geometrical configuration of the sensors by calculating connection relationships between the measurements during a non-disturbed preliminary resetting stage. It makes it possible to detect measurement failures as a result of the good detectability of the parity vector. It makes it possible to locate faults (identify faulty measurements) by a strategy based on constructing the parity matrix. It also makes it possible to reconstruct faulty measurements by taking advantage of the redundancy of the measurement axes.

What is claimed is:

1. A device for validating measurements of a dynamic magnitude x coming from an article having placed thereon three main sensors for sensing, respectively, along three concurrent main axes forming a basis $e=\{e_1\ e_2\ \ldots\ e_p\}$ of a physical space having p=3 dimensions, the three main sensors serving to measure components $V_j$ of said dynamic magnitude x along, respectively, the p=3 main axes, and the device comprising:

at least two additional sensors for measuring at least two additional components of said dynamic magnitude, said at least two additional sensors being placed on said article for sensing along at least two additional axes that are concurrent with said three main axes and that are not contained in any of the planes defined by any pair of said three main axes, said main and additional axes forming a set $a=\{a_1, a_2, \ldots, a_q\}$ of q observation axes, where q>p, and said three main and additional sensors together form a group of observation sensors;

determination means for determining an estimator U representative of said dynamic magnitude from said components $V_j$ j ∈1:q delivered by said observation sensors along, respectively, the q axes;

validation means for validating said determination of the estimator U representative of the dynamic magnitude;

error detector means for detecting a measurement error associated with said determination of the estimator U representative of the dynamic magnitude;

localization means for locating valid components of said dynamic magnitude not giving rise to said measurement error; and reconstitution means for reconstituting a new estimator U representative of said dynamic magnitude from said valid components delivered by said observation sensors, wherein the determination means for determining the estimator U representative of the dynamic magnitude comprise:

first calculation means for calculating an observation matrix M that synthesizes the geometrical configuration of said observation axes, the observation matrix M of dimension p×q being defined by M=C.A, C being the matrix of the direction cosines of the basis e, and A being the matrix component of the set a of q axes;

first calculation means for calculating an estimation matrix L from said observation matrix M satisfying $L.^T M=I_p$; and first calculation means for calculating said estimator U representative of the dynamic magnitude as a function of said estimation matrix L of said components $V_j$ measured by said observation sensors.

2. A device according to claim 1, wherein the validation means and/or the error detector means comprise:

second calculation means for calculating a parity matrix N from said observation matrix M, the parity matrix N being defined by $N.^T M=0$; and second calculation means for calculating a parity vector W associated with said parity matrix N and with said components $V_j$ of the dynamic magnitude measured by the observation sensors, serving to verify the validity of the estimator U representative of the dynamic magnitude, or to detect a measurement error associated with said determination of the estimator U, the parity vector W being defined by W=N.Z where Z is a matrix representation of the measurement error.

3. A device according to claim 2, wherein the validation means and/or the error detector means further comprise:

third calculation means for calculating a matrix of weights P from said parity matrix N and from said components $V_j$ of the dynamic magnitude, the matrix of weights P being equal to N.diag(V);

third calculation means for calculating a selection vector S from said matrix of weights P and from said parity vector W for discriminating between relationships that are representative of consistency or inconsistency between said components $V_j$ of the dynamic magnitude;

third calculation means for calculating a consistency quantification matrix Q for quantifying the validity levels of said components $V_j$ of the dynamic magnitude;

third calculation means for deducing a confidence vector R from the consistency quantification matrix Q to give the confidence level of each component of the dynamic magnitude measured by each of the observation sensors; and third calculation means for deducing a list of said valid components of said dynamic magnitude.

4. A device according to claim 1, including initialization means for identifying the positions of said additional axes relative to the main axes with determined accuracy.

5. A device according to claim 1, wherein the main axes comprise a first axis, a second axis, and a third axis forming a right-handed orthogonal frame of reference, and wherein at least one additional axis forms an angle of 45° relative to the second axis, with the directions of the first and third axes being symmetrical relative to the second axis.

6. A device according to claim 1, wherein the main axes form a right-handed orthogonal frame of reference, and wherein at least one additional axis occupies a position that is symmetrical relative to the three main axes.

7. A device according to claim 1, wherein the main sensors correspond to accelerometers measuring axial, radial, and tangential components of the dynamic magnitude, and wherein said additional sensors correspond to redundant accelerometers.

8. A device according to claim 1, wherein the dynamic magnitude corresponds to a vibration magnitude.

9. A device according to claim 1, wherein said article constituting the source of the dynamic magnitude is a rotary machine.

10. A computer implemented method of validating measurements of a dynamic magnitude coming from an article, on which there are placed three main sensors on three respective concurrent main axes forming a basis $e=\{e1\ e2\ \ldots\ ep\}$ of a physical space having p=3 dimensions, the three main sensors serving to measure components $V_j$ of said dynamic magnitude x, along, respectively, the p=3 main axes, using a computer having a non-transitory computer-readable medium having computer executable instructions stored therein for implementing the method, the method comprising the following steps:

measuring at least two additional components of said dynamic magnitude by means of at least two additional sensors placed on said article on at least two additional axes that are concurrent with said three main axes and that are not contained in any of the planes defined by any two of said three main axes, said main and additional axes forming a set a={a1, a2, a3 . . . aq} of q observation axes, where q>p and said three main and additional sensors together form a group of observation sensors;

determining an estimator U representative of said dynamic magnitude from said components Vj delivered by said observation sensors;

validating said determination of the estimator U representative of the dynamic magnitude;

detecting a measurement error associated with said determination of the estimator U representative of the dynamic magnitude;

locating valid components of said dynamic magnitude that do not generate said measurement error; and reconstituting a new estimator U representative of said dynamic magnitude from said valid components delivered by said observation sensors, wherein the determination of the estimator U representative of the dynamic magnitude comprises the following steps:

calculating an observation matrix M synthesizing the geometrical configuration of said observation axes, the observation matrix M of dimension pxq being defined by M=C.A, C being the matrix of the direction cosines of the basis e, and A being the matrix component of the set a of q axes;

calculating an estimation matrix L from said observation matrix M satisfying L.TM=Ip; and calculating said estimator U representative of the dynamic magnitude as a function of said estimation matrix L and of said components Vj measured by said observation sensors.

11. A method according to claim 10, wherein the validation and/or error detection steps comprise the following steps:

calculating a parity matrix N from said observation matrix M, the parity matrix N being defined by $N.^T M = 0$; and calculating a parity vector W associated with said parity matrix N and with said components $V_j$ of the dynamic magnitude measured by the observation sensors, serving to verify the validity of the estimator U representative of the dynamic magnitude, or to detect a measurement error associated with said determination of the estimator U, the parity vector W being defined by W=N.Z where Z is a matrix representation of the measurement error.

12. A method according to claim 11, wherein the validation and/or error detector steps further comprise the following steps:

calculating a matrix of weights P from said parity matrix N and from said components $V_j$ of the dynamic magnitude, the matrix of weights P being equal to N.diag(V);

calculating a selection vector S from said matrix of weights P and from said parity vector W making it possible to discriminate between relationships that represent consistency or inconsistency between said components $V_j$ of the dynamic magnitude;

calculating a consistency quantification matrix Q serving to quantify the validity levels of said components $V_j$ of the dynamic magnitude;

deducing a confidence vector R from the coherent quantification matrix Q serving to give the confidence level of each component of the dynamic magnitude as measured by each of the observation sensors; and deducing a list of said valid components of said dynamic magnitude.

13. A method according to claim 10, including an initialization step of identifying the positions of said additional axes relative to the main axes with determined accuracy.

14. A method according to claim 10, wherein the dynamic magnitude corresponds to a vibration magnitude.

15. A non-transitory computer readable medium containing computer instructions stored therein for causing a computer processor to perform a method of validating measurements of a dynamic magnitude x coming from an article on which there are placed three main sensors on three respective concurrent main axes forming a basis e={e1 e2 ... ep} of a physical space having p=3 dimensions, the three main sensors serving to measure components Vj of said dynamic magnitude x, along, respectively, the p=3 main axes, the method comprising:

measuring at least two additional components of said dynamic magnitude by means of at least two additional sensors placed on said article on at least two additional axes that are concurrent with said three main axes and that are not contained in any of the planes defined by any two of said three main axes, said main and additional axes forming a set a={a1, a2, a3, ... aq} of q observation axes, where q>p and said three main and additional sensors together form a group of observation sensors;

determining an estimator U representative of said dynamic magnitude from said components Vj delivered by said observation sensors;

Validating said determination of the estimator U representative of the dynamic magnitude;

detecting a measurement error associated with said determination of the estimator U representative of the dynamic magnitude;

locating valid components of said dynamic magnitude that do not generate said measurement error; and reconstituting a new estimator U representative of said dynamic magnitude from said valid components delivered by said observation sensors, wherein the determination of the estimator U representative of the dynamic magnitude comprises the following steps:

calculating an observation matrix M synthesizing the geometrical configuration of said observation axes, the observation matrix M of dimension p'q being defined by M=C.A, C being the matrix of the direction cosines of the basis e, and A being the matrix component of the set a of q axes;

calculating an estimation matrix L from said observation matrix M satisfying L.TM=Ip; and calculating said estimator U representative of the dynamic magnitude as a function of said estimation matrix L and of said components Vj measured by said observation sensors.

* * * * *

UNITED STATES PATENT AND TRADEMARK OFFICE
CERTIFICATE OF CORRECTION

PATENT NO. : 8,005,649 B2
APPLICATION NO. : 12/205077
DATED : August 23, 2011
INVENTOR(S) : Pierre Bornert et al.

It is certified that error appears in the above-identified patent and that said Letters Patent is hereby corrected as shown below:

In the Specification

Column 8, line 36, "(p$\leqq$s$\leqq$q)" should read --(p$\leq$s$\leq$q)--;

Column 8, line 38, [E.35], "$= \{j_1, \ldots, j_s \in 1: q \; \forall j \in (1:q) \notin J \; R_{jl} \geqq R_j\}$" should read $-- J = \{j_1, \ldots, j_s \in 1: q \quad \forall j \in (1:q) \notin J \quad R_{j_l} \geq R_j\} \quad --;$ Column 9, line 30, "$q_j \geqq p$" should read --$q_j \geq p$--;

Column 9, line 35, "$0 \leqq q_j < p$" should read --$0 \leq q_j < p$--;

Column 12, line 28, [E.64], "$\forall k \in 1: q-p \quad \forall i \in 1: p \quad D_{ik} = \langle e_p b_k z, 41$" should read $-- \forall k \in 1: q-p \quad \forall i \in 1: p \quad D_{ik} = \langle e_i, b_k \rangle \quad --;$ Column 12, line 33, [E.65], "α=acos(D)" should read --Δ=acos(D)--;

Column 12, line 37, "(p$\geqq$3)," should read --(p$\geq$3),--;

Column 14, line 47, "$V_4(q \geqq 4)$." should read --$V_4(q \geq 4)$.--;

In the Claims

Column 18, claim 10, line 46, "magnitude coming" should read --magnitude *x* coming--; and Column 19, claim 10, line 19, "of*q*" should read --of *q*--.

Signed and Sealed this
Twenty-sixth Day of November, 2013

Margaret A. Focarino
*Commissioner for Patents of the United States Patent and Trademark Office*